(12) United States Patent
Saito

(10) Patent No.: US 8,213,312 B2
(45) Date of Patent: *Jul. 3, 2012

(54) COMMUNICATION NETWORK DESIGN

(75) Inventor: Hiroyuki Saito, Tokyo (JP)

(73) Assignee: Juniper Networks, Inc., Sunnyvale, CA (US)

(*) Notice: Subject to any disclaimer, the term of this patent is extended or adjusted under 35 U.S.C. 154(b) by 73 days.

This patent is subject to a terminal disclaimer.

(21) Appl. No.: 12/571,072

(22) Filed: Sep. 30, 2009

(65) Prior Publication Data

US 2010/0020692 A1    Jan. 28, 2010

Related U.S. Application Data

(63) Continuation of application No. 11/850,417, filed on Sep. 5, 2007, now Pat. No. 7,616,569, which is a continuation of application No. 09/924,054, filed on Aug. 8, 2001, now Pat. No. 7,295,515.

(30) Foreign Application Priority Data

Aug. 9, 2000 (JP) ................................. 2000-240546

(51) Int. Cl.
*H04L 12/28* (2006.01)
*H04L 12/56* (2006.01)
*G06F 15/177* (2006.01)

(52) U.S. Cl. ........ 370/232; 370/233; 370/235; 370/238; 370/229; 370/230.1; 370/389; 370/395.1; 370/352; 370/400; 370/468; 709/220; 709/222; 709/226; 709/238; 709/239

(58) Field of Classification Search .................. 370/229, 370/230.1, 232, 233, 235, 237, 238, 238.1, 370/252, 351, 389, 395.1, 395.21, 395.32, 370/395.41, 400, 468, 477, 537, 538, 540, 370/395.4; 340/2.1, 2.23, 2.24, 3.1; 709/220–226, 709/239

See application file for complete search history.

(56) References Cited

U.S. PATENT DOCUMENTS 4,156,798 A * 5/1979 Doelz .............................. 700/4
(Continued)

FOREIGN PATENT DOCUMENTS

JP    2000-22750    1/2000
(Continued)

OTHER PUBLICATIONS

Bandwidth management and congestion control in plaNET; Cidon, I. Gopal, I. Guerin, R.; Technion; Haifa; This paper appears in: Communications Magazine, IEEE Publciation Date: Oct. 1991 vol. 29, Issue: 10 on pp. 54-64.

(Continued)

*Primary Examiner* — Ayaz Sheikh
*Assistant Examiner* — Venkatesh Haliyur
(74) *Attorney, Agent, or Firm* — Harrity & Harrity, LLP

(57) ABSTRACT

A communication network design circuit can derive a path and a necessary link capacity for multiple point communication service permitting arbitrary communication within a predetermined range of communication amount by providing traffic amount of data in-flowing through an ingress node and traffic amount of data flowing out through an egress node. The communication network designing circuit has setting means for setting a mathematical programming problem for deriving the multiple point communication service and optimizing means for solving the mathematical programming problem set by the setting means and obtaining the path for the multiple point communication service.

18 Claims, 3 Drawing Sheets

U.S. PATENT DOCUMENTS

| | | | |
|---|---|---|---|
| 4,669,113 | A | 5/1987 | Ash et al. |
| 4,814,979 | A * | 3/1989 | Neches .................. 718/106 |
| 5,166,927 | A | 11/1992 | Iida et al. |
| 5,440,687 | A | 8/1995 | Coleman et al. |
| 5,546,542 | A | 8/1996 | Cosares et al. |
| 5,721,727 | A * | 2/1998 | Ashi et al. .................. 370/244 |
| 5,808,880 | A | 9/1998 | Marvin |
| 6,069,894 | A | 5/2000 | Holender et al. |
| 6,141,318 | A | 10/2000 | Miyao |
| 6,205,117 | B1 | 3/2001 | Doshi et al. |
| 6,363,319 | B1 | 3/2002 | Hsu |
| 6,381,046 | B1 | 4/2002 | Wilfong et al. |
| 6,389,034 | B1 * | 5/2002 | Guo et al. .................. 370/441 |
| 6,404,744 | B1 * | 6/2002 | Saito .................. 370/255 |
| 6,438,107 | B1 | 8/2002 | Somiya et al. |
| 6,483,808 | B1 * | 11/2002 | Rochberger et al. .......... 370/238 |
| 6,507,561 | B1 * | 1/2003 | Baniewicz et al. .......... 370/216 |
| 6,512,740 | B1 * | 1/2003 | Baniewicz et al. .......... 370/216 |
| 6,519,693 | B1 | 2/2003 | Debey |
| 6,538,991 | B1 | 3/2003 | Kodialam et al. |
| 6,721,270 | B1 | 4/2004 | Mitra et al. |
| 6,760,314 | B1 | 7/2004 | Iwata |
| 6,795,399 | B1 * | 9/2004 | Benmohamed et al. ...... 370/235 |
| 6,807,653 | B2 | 10/2004 | Saito |
| 6,853,642 | B1 * | 2/2005 | Sitaraman et al. ......... 370/395.4 |
| 6,934,283 | B1 * | 8/2005 | Warner .................. 370/380 |
| 6,952,398 | B1 * | 10/2005 | Fahim .................. 370/229 |
| 7,006,488 | B1 | 2/2006 | Saito |
| 7,099,807 | B2 | 8/2006 | Shiraki et al. |
| 7,162,632 | B2 | 1/2007 | Cao et al. |
| 7,212,495 | B2 * | 5/2007 | Karri et al. .................. 370/238 |
| 7,219,159 | B2 * | 5/2007 | Mouri et al. .................. 709/241 |
| 7,295,515 | B2 * | 11/2007 | Saito .................. 370/232 |
| 7,346,056 | B2 | 3/2008 | Devi |
| 7,487,247 | B1 | 2/2009 | Li et al. |
| 7,616,569 | B2 * | 11/2009 | Saito .................. 370/232 |
| 7,774,440 | B1 * | 8/2010 | Bagrodia et al. ........... 709/221 |
| 2002/0116374 | A1 | 8/2002 | Bette et al. |
| 2004/0085962 | A1 | 5/2004 | Sugai et al. |
| 2005/0201285 | A1 | 9/2005 | Simonis |
| 2005/0226214 | A1 | 10/2005 | Keslassy et al. |
| 2007/0076615 | A1 | 4/2007 | Lea et al. |
| 2008/0019266 | A1 | 1/2008 | Liu et al. |
| 2008/0155070 | A1 | 6/2008 | El-Damhougy et al. |

FOREIGN PATENT DOCUMENTS

| | | |
|---|---|---|
| JP | 2001-36574 | 2/2001 |

OTHER PUBLICATIONS

Traffic load monitoring and load balancing for the Internet; Journal Cluster Computing Publisher Spring Netherlands, ISSN 1386-7857 (Print) 1573-7543 (Online) Issue vol. 3, No. 2, Sep. 2000.

Quality of Service Routing in Integrated Services Networks; Qingming Ma; Jan. 1998.

Determination of Parallel Software Organizations for Performance-Constrained and Connectivity-Constrained Distributed Systems Fergany, T.A. Sholl, H.A.; Dept. of Comput. Sci. & Eng., Connecticut Univ., Storrs, CT; This paper appears in: Systems, Man and Cybernetics, 1989. Conference Proceedings., IEEE International Conference on Publication Date.

Software Partitioning for Distributed, Sequential, Pipelined Applications; Iyer, V.R. Sholl, H.A. Cadware Group Ltd., 869 Whalley Avenue, New Haven, CT 06405.; This paper appears in: Software Engineering, IEEE Transactions on Publication Date: Oct. 1989 vol. 15, Issue: 10 on pp. 1270-1279.

Yijun Xiong et al., IEEE Infocom '97, "Restoration Strategies and Spare Capacity Requirements in Self-Healing ATM Networks", pp. 353-360, Apr. 7-11, 1997, Kobe Japan.

Alexander Gersht et al., "Dynamic Bandwidth-Allocation and Path-Restoration in SONET Self-Healing Networks", IEEE Transactions on Reliability, vol. 45, No. 2, Jun. 1996, pp. 321-331.

Co-pending U.S. Appl. No. 11/850,417, filed Sep. 5, 2007 entitled "Communication Network Design" by Hiroyuki Saito, 35 pages.

* cited by examiner

COMMUNICATION NETWORK DESIGN

RELATED APPLICATIONS

This application is a continuation of U.S. patent application Ser. No. 11/850,417 filed Sep. 5, 2007 which is a continuation of U.S. patent application Ser. No. 09/924,054 filed Aug. 8, 2001, now U.S. Pat. No. 7,295,515, the entire contents of which are incorporated by reference herein.

BACKGROUND OF THE INVENTION

1. Field of the Invention

The present invention relates generally to a communication network designing circuit, a designing method thereof, a storage medium storing its control program and a transmission medium. More particularly, the present invention relates to a designing method of a communication service between multiple points for permitting arbitrary communication within a given range by providing a traffic amount of data in-flowing from an ingress node through which data enters from other network and a traffic amount of data flowing out from an egress node through which data is fed to other network, in an objective network consisted of a plurality of nodes and connected to other networks.

2. Description of the Related Art

Conventionally, in a communication network designing method, such as a method disclosed in "Restoration strategies and spare capacity requirements in self-healing ATM networks" (Yi jun Xiong and Lorne Mason, INFOCOM'97, April, 1997), a path for communication between single nodes has been designed. In the disclosed methods, a communication amount is determined for each node pair to communicate and a path of fixed band is set between each node pair.

One example of a result of design based on the conventional designing method is shown in FIG. 4. At first, the conventional designing method will be discussed with reference to FIG. 4. In FIG. 4, the references sign d1 denotes a network range to be objective for the designing method, which will be referred to as objective network. The reference signs n1 to n7 identify nodes, and u1 to u4 identify networks other than design objective range. Communication traffic between these networks flows in and out the objective network. Hereinafter, the networks other than object will be referred to as user network.

For example, u1 to u4 denote different stations of the user network. Among nodes, a node located on a boundary between the objective network and the user network will be referred to as edge node. Nodes located in the objective network will be referred to as core nodes.

When data enters from the user network, the edge node is taken as an ingress node, and when data flow to the user network, the edge node is taken as an egress node. Normally, the edge node serves both for the ingress node and the egress node. It should be noted that the node generally referred to includes both of the edge node and the core node. On the other hand, lines between nodes and between the node and the network out of object represent links. These links are expressed, such as (n1, n2), (u1, n2) and so forth.

In FIG. 4, only one link is described, it represents presence of links in both directions. For example, a link (n1, n2) includes both of a link from n1 to n2 and a link from n2 to n1. It should be noted that, between one node pair, any number of links may be present. The link has a band in attribute. In FIG. 4, only bands of the portions necessary for discussion are described.

Now, in a certain communication service between multiple points, it is assumed that data flows in through an ingress node n3 at a data rate of 2 Mb/s, data flows in through an ingress node n1 at a data rate of 1 Mb/s, data flows out through an egress node n6 at a data rate of 2 Mb/s, and data flows out through an egress node n5 at a data rate of 1 Mb/s.

In the conventional designing method, fixed paths have to be set between respective ingress nodes and egress nodes. For example, paths are designed by determining each traffic amount that <n2, n7> is 1 Mb/s, <n2, n6> is 2 Mb/s, <n1, n7> is 1 Mb/s, <n1, n6> is 1 Mb/s. Here, paths are expressed by p1 to p4. An example where paths as shown in FIG. 4 are designed by the conventional design method, is shown.

However, in the conventional design method, since each path is designed by providing communication amount per ingress/egress pair, it become not possible to design a service in a mode permitting arbitrary communication within a given range of communication amount by providing the communication amount entering into each start node from the user network and the communication amount exiting from each end node to the user network.

SUMMARY OF THE INVENTION

The present invention has been worked out in view of the problem set forth above. It is therefore an object of the present invention to provide a communication network design circuit, a designing method thereof, a storage medium storing its control program and a transmission medium which can derive a path and a necessary link capacity for multiple point communication service permitting arbitrary communication within a predetermined range of communication amount by providing only traffic amount of data in-flowing through an ingress node and traffic amount of data flowing out through an egress node.

According to the first aspect of the invention, a communication network designing circuit for multiple point communication service for permitting arbitrary communication within a predetermined range by providing a traffic amount of data inflowing from an ingress node through which data flow in from other network and a traffic amount of data flowing out from an egress node through which data is fed to other network, in an object network consisted of a plurality of nodes and connected to other network, comprises:

setting means for setting a mathematical programming problem for deriving the multiple point communication service; and optimizing means for solving the mathematical programming problem set by the setting means and obtaining a path for the multiple point communication service.

According to the second aspect of the present invention, a communication network designing method for multiple point communication service for permitting arbitrary communication within a predetermined range by providing a traffic amount of data inflowing from an ingress node through which data flow in from other network and a traffic amount of data flowing out from an egress node through which data is fed to other network, in an object network consisted of a plurality of nodes and connected to other network, comprises:

setting step of setting a mathematical programming problem for deriving the multiple point communication service; and optimizing step of solving the mathematical programming problem set in the setting step and obtaining a path for the multiple point communication service.

According to the third aspect of the present invention, a storage medium storing a communication network design control program for designing a communication network for multiple point communication service for permitting arbitrary communication within a predetermined range by providing a traffic amount of data inflowing from an ingress node through which data flow in from other network and a traffic amount of data flowing out from an egress node through which data is fed to other network, in an object network consisted of a plurality of nodes and connected to other network, the communication network design control program comprising:

setting step of operating a computer for setting a mathematical programming problem for deriving the multiple point communication service; and optimizing step of operating the computer for solving the mathematical programming problem set in the setting step and obtaining a path for the multiple point communication service.

According to the fourth aspect of the present invention, a transmission medium transmitting a communication network design control program for designing a communication network for multiple point communication service for permitting arbitrary communication within a predetermined range by providing a traffic amount of data inflowing from an ingress node through which data flow in from other network and a traffic amount of data flowing out from an egress node through which data is fed to other network, in an object network consisted of a plurality of nodes and connected to other network, the communication network design control program comprising:

setting step of operating a computer for setting a mathematical programming problem for deriving the multiple point communication service; and optimizing step of operating the computer for solving the mathematical programming problem set in the setting step and obtaining a path for the multiple point communication service.

In the communication network designing circuit according to the present insention, the mathematical programming problem for deriving the multiple point communication service is generated by respective of optimization reference generating means, route selecting condition generating means, route selecting condition generating means, per-user necessary link capacity calculating condition generating means and link including condition generating means.

The optimization reference generating means sets an objective function for minimizing a link load in the object network and serving as an optimization reference and sets a constraint expression for deriving the link load. The route selecting condition generating means generates a constraint expression for selecting a route for including traffic of data inflowing from other network to the object network.

The per-user necessary link capacity calculating condition generating means generates a constraint expression for calculating a necessary link band of each link per traffic of data inflowing from each ingress node. The link including condition generating means generates a constraint expression so as not to exceed a link capacity limit in each link. The optimizing means solves the mathematical programming problem with the means set forth above.

Thus, it becomes possible to obtain the path for the multiple point communication service which permits arbitrary communication within a predetermined range by providing only traffic amount inflowing from the ingress node and traffic amount flowing out from the egress node.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details.

Figure 1:
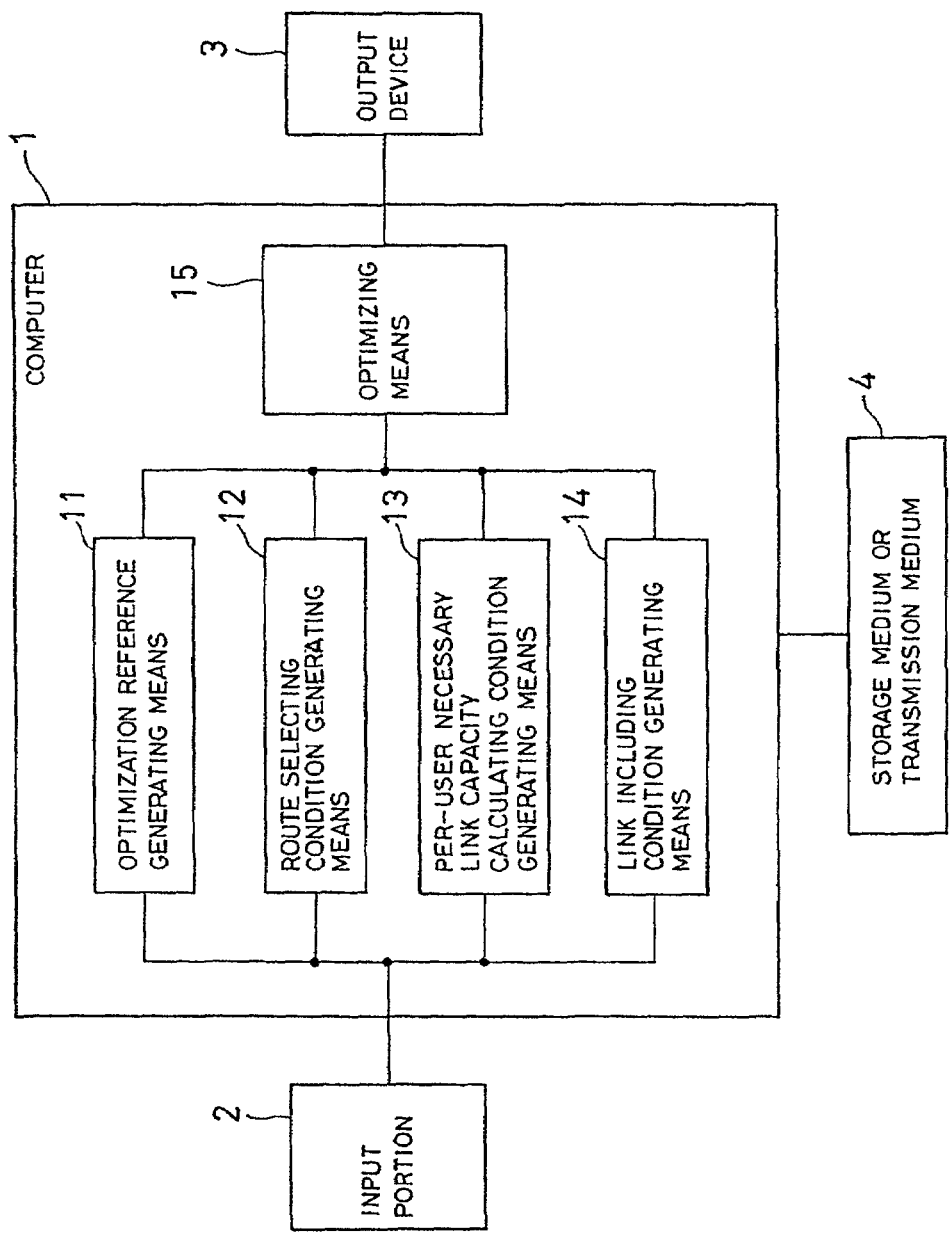
FIG. 1 is a block diagram showing a construction of one embodiment of a design circuit for a multiple point communication service according to the present invention.

FIG. 1 is a block diagram showing a construction of one embodiment of a design circuit for a multiple point communication service (hereinafter referred to as design circuit), according to the present invention. In FIG. 1, one embodiment of a design circuit according to the present invention is constructed with a computer 1, an input portion 2, such as a keyboard or the like, an output device 3, such as a display device or the like, and a storage medium (or transmission medium) 4.

The computer 1 includes an optimization reference generating means 11, a route selecting condition generating means 12, a per-user necessary link capacity calculating condition generating means 13, a link including condition generating means 14 and an optimizing means 15.

The storage medium 4 may be floppy disk, ROM (read-only-memory) and other storage medium or a medium to be transmitted through a network. In the storage medium, programs for making the computer 1 to function as the design circuit for the multiple point communication service is recorded.

The program is read out from the storage medium 4 by the computer 1 and controls operation of the computer 1 for realizing respective functions of the optimization reference generating means 11, the route selecting condition generating means 12, the per-user necessary link capacity calculating condition generating means 13, the link including condition generating means 14 and the optimizing means 15.

The optimization reference generating means 11 sets an objective function to minimize a link load in the objective network and be an optimization reference, and further sets a constraint expression for deriving the link load. The route selecting condition generating means 12 generates a constraint expression for selecting a route for receiving data traffic inflowing from other network.

The per-user necessary link capacity calculating condition generating means 13 generates a constraint expression for calculating a necessary link band for each link per data traffic inflowing from each ingress node.

The link including condition generating means 14 generates a constraint expression so as not to exceed a link capacity limitation in each link. The optimizing means 15 solves a mathematical programming problem respectively generated by the optimization reference generating means 11, the route selecting condition generating means 12, the per-user necessary link capacity calculating condition generating means 13 and the link including condition generating means 14 to obtain a path for the multiple point communication service.

Subsequently, operation of the shown embodiment will be discussed in detail. At first, signs to be used in the shown embodiment will be discussed. These signs are categorized as aggregates, parameters and constants. As aggregates, L represents link aggregate, D represents user aggregate, $N_d$ represents input edge node aggregate of user d, $P_d$ represents pair aggregate of ingress node and egress node of user d, $I_{(a, z)}$ represents path candidate aggregate between ingress edge node a and egress edge node z.

In the link aggregate L, respective elements are expressed by (l, m, k). Here, l represents departing node, m represents arriving node, and k represents an identifier in case a plurality of links are present between the same nodes. The last identifier will be referred to as sub-link identifier. In the user aggregate D, one multiple point service is present per each user. In the path candidate aggregate $I_{(a,z)}$ each element is expressed as $i_{(a,\ z)}$.

As parameters, $f_i$ represents 0-1 parameter, $\phi$ represents the link load in the objective network, $w_{(l,m,k)ad}$ represents total of data flow flowing to the egress edge node.

The 0-1 parameter $f_i$ takes 1 when the path candidate $i_{(a,\ z)}$ between the ingress edge node a and the egress edge node z is introduced as a path, and 0 otherwise. The total $W_{(l,m,k)ad}$ of data flow flowing to the egress edge node relates to a traffic of data in-flowing from the ingress edge node a of the user d to express a total of data flow flowing to the egress edge node located downstream side of the link (l, m, k).

As constants, $v_{ad}$ represents traffic amount of data in-flowing from the ingress edge node a, $v_{zd}$ represents traffic amount of data flowing out from the egress edge node z, $g_i$ represents an indicator constant, $c^{(l,m,k)}$ represents capacity limitation in the link (l, m, k).

The traffic amount $v_{ad}$ represents a traffic amount of data in-flowing from the ingress edge node a with relation to the user d, the traffic amount $v_{zd}$ represents a traffic amount of data flowing out from the egress edge node z with relation to the user d. The indicator constant $g_i$ takes 1 when the path candidate $i_{(a,z)}$ goes through the link (l, m, k), and 0 otherwise.

Discussion will be given for one embodiment of the designing circuit according to the present invention using the foregoing signs. At first, the optimization reference generating means 11 sets the objective function $$\text{Min} \phi \quad (1)$$

to minimize the link load in the objective network and be the optimization reference, and further sets the constraint expression $$\phi \geq \left( \sum_{d \in D} \sum_{a \in N_d} w_{(l,m,k)ad} \right) / c^{given} (\forall\ (l, m, k) \in L) \quad (2)$$

for deriving the link load $\phi$.

Subsequently, the route selecting condition generating means 12 generates the constraint expression for selecting the route including the traffic of data inflowing from other network:

$$\sum_{i_{(a,z)} \in I_{(a,z)}} f^d_{i_{(a,z)}} = 1 (\forall\ (a, z) \in P_d,\ \forall\ d \in D) \quad (3)$$

wherein $f_{i_{(a,z)}}{}^d$ is taken as $f_i$.

$$f_{i_{(a,z)}}{}^d = 0/1 \quad (4)$$

The per-user necessary link capacity calculating condition generating means 13 generates the constraint expression for calculating a link band necessary in each link per traffic of data inflowing from the ingress node of each user.

$$w_{(l,m,k)ad} = \min \left\{ v^{in}_{ad},\ \sum_{\{z;(a,z) \in P_d\}} \sum_{\{i_{a,z} \in I_{(a,z)}\}} v^{out}_{zd} g^{(l,m,k)}_{i_{(a,z)}} f^d_{i_{(a,z)}} \right\} \quad (5)$$

$$(\forall\ d \in D, \forall\ a \in N)$$

wherein $v_{ad}{}^{in}$ is $v_{ad}$, $v_{zd}{}^{out}$ is $v_{zd}$ and $g_{i_{(a,z)}}{}^{(l,m,k)}$ is $g_i$.

The link including condition generating means 14 generates the constraint expression so as not to exceed the link capacity limit in respective link.

$$\sum_{d \in D} \sum_{a \in N_d} w_{(l,m,k)ad} \leq c^{given} (\forall\ (l, m, k) \in L) \quad (6)$$

Finally, the optimizing means 15 solves the mathematical programming problem generated by respective of the optimization reference generating means 11, route selecting condition generating means 12, the per-user necessary link capacity calculating condition generating means 13 and the link including condition generating means 14, namely the foregoing expressions (1) to (6) for obtaining path for the multiple point communication service.

Figure 2:
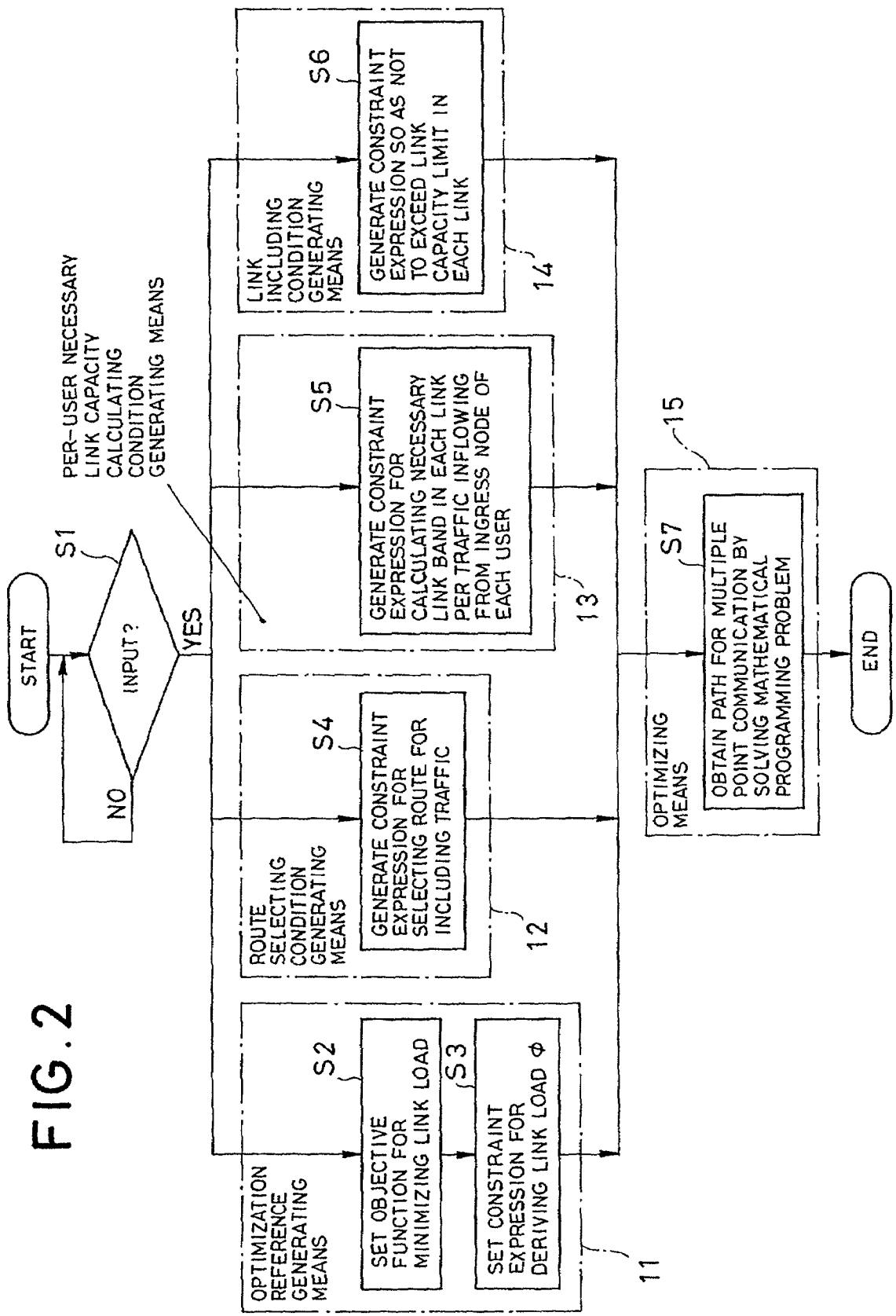
FIG. 2 is a flowchart showing process operation of one embodiment of the design circuit for the multiple point communication service according to the present invention.

FIG. 2 is a flowchart showing a processing operation of one embodiment of the design circuit according to the present invention. The processing operation of one embodiment of the design circuit according to the present invention will be discussed with reference to FIGS. 1 and 2. It should be noted that the processing operation shown in FIG. 2 is realized by the computer 1 executing the program stored in the storage medium 4.

When the foregoing aggregates, parameters and constants are input from the input portion 2 (step S1 of FIG. 2), the optimization reference generating means 11 sets the objective function [expression (1)] to minimize the link load $\phi$ in the objective network and be the optimization reference (step S2 of FIG. 2), and sets the constraint expression [expression (2)] for deriving the link load $\phi$ (step S3 of FIG. 2).

Similarly, when the foregoing aggregates, parameters and constants are input (steps S1 of FIG. 2), the route selecting condition generating means 12 generates the constraint expression [expression (3)] for selecting the route including the traffic of data inflowing from the user network (step S4 of FIG. 2) and the per-user necessary link capacity calculating condition generating means 13 generates the constraint expression [expression (5)] for calculating the necessary link band in respective links per traffic of data inflowing from respective ingress nodes (step S5 of FIG. 2).

On the other hand, when the foregoing aggregates, parameters and constants are input (steps S1 of FIG. 2), the link including condition generating means 14 generates the constraint expression [expression (6)] so as not to exceed the link capacity limit in respective links (step S6 of FIG. 2).

As set forth above, by the optimization reference generating means 11, the route selecting condition generating means 12, the per-user necessary link capacity calculating condition generating means 13 and link including condition generating means 14, mathematical programming problem for deriving the multiple point service is set in parallel. Therefore, the optimizing means 15 solves the mathematical programming problem for obtaining path for the multiple point communication service (step S7 of FIG. 2).

Figure 3:
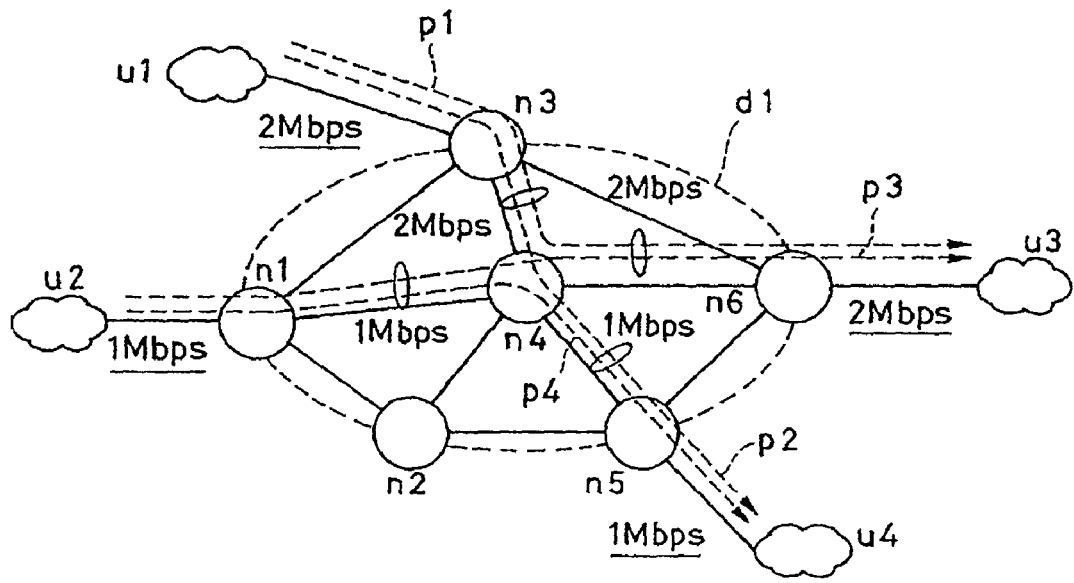
FIG. 3 is an illustration showing one example of result of design of the multiple point communication service in one embodiment of the present invention.
Figure 4:
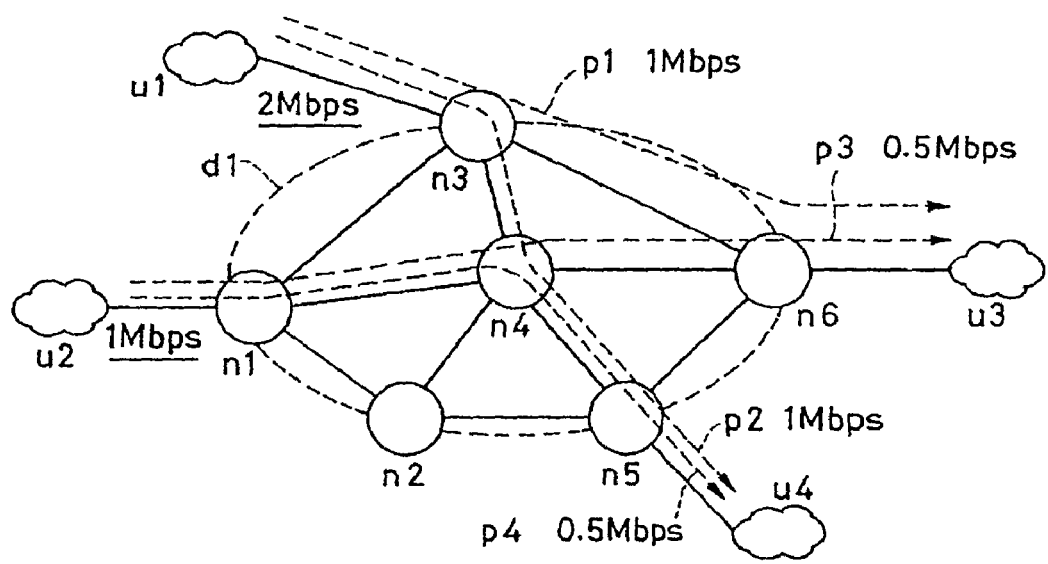
FIG. 4 is an illustration showing one example of result of design of a multiple point communication service in the prior art.

FIG. 3 is an illustration showing one example of a result of designing of the multiple point service in one embodiment of the present invention. One example of the result of designing of the multiple point communication service in one embodiment of the present invention will be discussed with reference to FIG. 3.

In FIG. 3, the reference sign d1 represents a network range to be object in the designing method. This will be referred to as objective network. The reference signs n1 to n7 represent nodes. The reference signs u1 to u4 represent network other than design object. Communication traffic between these networks flows in and out the object network. The network other than the object network will be referred to as user network. For example, the reference signs u1 to u4 represent different station of the user network.

Among nodes, nodes located on the boundary between the objective network and the user network will be referred to as edge nodes, and the nodes in the object network will be referred to as core nodes. When traffic enters from the user network, the edge node is referred to as ingress node. On the other hand, when the traffic exits to the user network, the edge node is referred to as egress node.

Normally, the edge node serves as both of ingress node/egress node. It should be noted that both of the core node and the edge node are generally referred to as "node". On the other hand, lines between the nodes and between the node and the network other than object network represent links. These links are expressed as (n1, n2), (u1, n2) and so forth.

In FIG. 3, only one link is described, it represents presence of links in both directions. For example, a link (n1, n2) includes both of a link from n1 to n2 and a link from n2 to n1. It should be noted that, between one node pair, any number of links may be present. The link has a band in attribute. In FIG. 3, only bands of the portions necessary for discussion are described.

Now, in a certain communication service between multiple points, it is assumed that data flows in through an ingress node n3 at a data rate of 2 Mb/s, data flows in through an ingress node n1 at a data rate of 1 Mb/s, data flows out through an egress node n6 at a data rate of 2 Mb/s, and data flows out through an egress node n5 at a data rate of 1 Mb/s.

Then, in order to permit communication freely within a range of the above inflow amount and the above flowing out amount between the arbitrary ingress/egress node pairs <n3, n6>, <n3, n5>, <n1, n6>, <n1, n5>, paths p1 to p4 are derived.

On the other hand, necessary band, namely necessary transmission speed (bit rate) for the multiple point communication service is 2 Mb/s in the link (n3, n4), 2 Mb/s in the link (n4, n6), 1 Mb/s in the link (n1, n4) and 1 Mb/s in the link (n4, n5).

Here, for example, in the link (n4, n5), data inflows at data rate of 2 Mb/s from the node n3 and data inflows at data of rate 1 Mb/s from the node n1. Therefore, in the link (n4,n5), it is possible that data may flow at a data rate of 3 Mb/s at the maximum. However, since the traffic amount of data flowing out from the node 5 is 1 Mb/s, the necessary link capacity, namely necessary the data rate of the link (n4, n5) becomes 1 Mb/s.

Thus, as mathematical programming problem of the designing method for the multiple point communication service, the problem is set by the optimization reference generating means 11, the route selecting condition generating means 12, the per-user necessary link capacity calculating condition generating means 13 and the link including condition generating means 14 respectively, and solved by the optimizing means 15, path and necessary link capacity for the multiple point communication service permitting arbitrary communication within the predetermined range by providing only traffic amount of data inflowing from the ingress node and traffic amount of data flowing out from the egress node, can be derived.

In the foregoing constants, when $\eta$ is added as minimum link vacant capacity, the optimization reference generating means 11 sets an object function $$\text{Maximize } \eta \tag{7}$$

for maximizing the vacant capacity of the link in the object network, and a constraint expression for deriving the vacant capacity is set as following expression (8):

$$c^{given} - \sum_{d \in D}\sum_{a \in N_d} w_{(l,m,k)ad} \geq \eta (\forall\ (l, m, k) \in L) \tag{8}$$

By performing setting of this, the optimization reference generating means 11 may generate the mathematical programming problem for optimization.

On the other hand, in the foregoing parameters, when $\omega_{(l,m,k)}$ is added as a link cost per unit capacity of the link (l, m, k), the optimization reference generating means 11 sets an object function $$\text{Maximize } \sum_{(l,m,k) \in L} w_l \tag{9}$$

for including the traffic of data inflowing to the objective network at the minimum link cost.

By performing setting, the maximizing reference generating means 11 may generate the mathematical programming problem for optimization.

Subsequently, discussion will be given for the case where the per-user necessary link capacity calculating condition generating means 13 sets the constraint expression for calculating the necessary link band in each link per traffic of data inflowing from the ingress node of each user, as constraint expression for an integer programming problem. The integer programming problem is one kind of the mathematical programming problem, and in the optimizing means 15, various solutions for the integer programming problem, which have been well known may be used.

Now, $x_{(l,m,k)ad}$ is set as 0-1 parameter which takes 1 when a total of the flow to the egress edge node located downstream of the link (l, m, k) is greater than the traffic amount $v_{ad}$ inflowing to the ingress edge node a concerning the inflowing traffic from the ingress edge node a of the user d, and takes 0 otherwise. Also, M is assumed as arbitrary large number. Here, M is expressed as:

$$M = \sum_{\{z:\ (a,z) \in P_d\}} v_{ad}^{out} \tag{10}$$

The per-user necessary link capacity calculating condition generating means 13 sets the following three constraint expressions using those set forth above.

$$x_{(l,m,k)} \leq \frac{\left\{\sum_{\{z;(a,z)\in P_d\}} \sum_{(i_{a,z}\in l_{(a,z)})} v_{zad}^{out} g_{i(a,z)}^{(l,m,k)} f_{i(a,z)}^d\right\}}{v_{ad}^{in}} \quad (11)$$

$$(\forall a \in N_d, \forall d \in D, \forall (l, m, k) \in L)$$

$$\frac{\left\{\sum_{\{z;(a,z)\in P_d\}} \sum_{(i_{a,z}\in l_{(a,z)})} v_{ad}^{out} g_{i(a,z)}^{(l,m,k)} f_{i(a,z)}^d\right\}}{v_{ad}^{in}} \leq w_{(l,m,k)ad} + M x_{(l,m,k)ad} \quad (12)$$

$$(\forall a \in N_d, \forall d \in D, \forall (l, m, k) \in L)$$

$$v_{ad}^{in} x_{(l,m,k)ad} \leq w_{(l,m,k)ad} \quad (13)$$

$$(\forall a \in N_d, \forall d \in D, \forall (l, m, k) \in L)$$

By this, the per-user necessary link capacity calculating condition generating means 13 sets the constraint expression for calculating the necessary link band in each link-per traffic inflowing from the ingress edge node a of each user, as the constraint expression for the integer programming problem.

As set forth above, with the present invention, in the communication network designing circuit for multiple point communication service permitting arbitrary communication within the predetermined range by providing traffic amount of data inflowing from the ingress node, through which data inflows from other network, and traffic amount of data flowing out through the egress node, through which data is fed to other network, in the object network consisted of a plurality of nodes and connected to other network, the mathematical programming problem is set for deriving multiple point communication service, a path for multiple point communication service is obtained by solving the mathematical programming problem for deriving the path and necessary link capacity for multiple point communication service permitting arbitrary communication within the predetermined range by providing only traffic amount of data inflowing from the ingress node and traffic amount of data flowing out through the egress node.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. In a network that includes a plurality of ingress nodes, a plurality of egress nodes, and a plurality of links to connect ones of the ingress nodes to ones of the egress nodes, a method comprising:
   associating, by a device, input data rates with each of the plurality of ingress nodes and output data rates with each of the plurality of egress nodes;
   performing, in the device, parallel processing, the parallel processing including:
      performing, by a device, a first process to determine a link load associated with each of the plurality of links,
      performing, by the device, a second process to determine a plurality of possible paths for transmitting data traffic received at one of the plurality of ingress nodes through the network,
      performing, by the device, a third process to determine a bandwidth range for the plurality of links based on the data traffic received at the one of the plurality ingress nodes, and
      performing, by the device, a fourth process to be used to determine a maximum bandwidth associated with ones of the plurality of links; and
   determining, by the device and based on the first process, the second process, the third process, and the fourth process, the plurality of possible paths, including a selected path, for transmitting data traffic, received at one of the plurality of ingress nodes through the network, at an arbitrary data rate within a range, where the range is based on the input data rates and the output data rates.

2. The method of claim 1, further comprising:
   receiving input information that includes aggregates, parameters, and constants.

3. The method of claim 2, where performing the second process, further comprises:
   using one parameter of the received parameters, the one parameter of the received parameters comprising a set state or an unset state.

4. The method of claim 3, where the one parameter of the received parameters comprises the set state when a first one of the plurality of possible paths is introduced as the selected path.

5. The method of claim 1, where each of the plurality of possible paths allow data traffic received at a first ingress node of the plurality of ingress nodes to be transmitted to a first egress node of the plurality of egress nodes.

6. A system comprising:
   a plurality of nodes coupled via a plurality of links, the plurality of nodes including ingress nodes to receive data transmitted into the system, an input data rate being associated with each ingress node, and egress nodes to transmit data out of the system, an output data rate being associated with each egress node; and
   a computer to:
      generate an objective function to minimize a link load in the system,
      generate a first constraint expression to determine the link load,
      generate, contemporaneously with the generation of the first constraint expression, a second constraint expression to determine the plurality of paths, each of the plurality of paths comprising at least one ingress node, at least one egress node, and at least one link coupling the at least one ingress node and the at least one egress node,
      generate a third constraint expression to determine link bands for the plurality of links based on an amount of traffic received by the ingress nodes,
      generate a fourth constraint expression to prevent link capacity limits associated with the plurality of links from being exceeded, and
      derive a path and a link capacity to permit, within the system, an arbitrary data rate, the arbitrary data rate being within a range, the range being based on the input data rates and the output data rates based on the objective function, the first constraint equation, the second constraint equation, the third constraint equation, and the fourth constraint equation.

7. The system of claim 6, where the computer is further to:
determine a plurality of paths, the plurality of paths including the path.

8. The system of claim 7, where the computer is further to:
perform parallel processing to solve the first constraint equation, the second constraint equation, the third constraint equation, and the fourth constraint equation.

9. The system of claim 6, where the computer is further to:
set an objective function for maximizing a vacant capacity of links associated with the plurality of paths, and
generate a fifth constraint expression to derive the vacant capacity of links associated with the plurality of paths.

10. The system of claim 6, where the computer is further to:
receive parameters related to transmitting data through the system, and
generate the second constraint expression using at least one of the parameters.

11. The system of claim 10, where the computer is further to:
generate the second constraint expression using a first parameter of the received parameters, the first parameter of the received parameters comprising a first value or a second value.

12. The system of claim 11, where the computer is further to:
generate the second constraint expression using the first parameter of the received parameters, the first parameter of the received parameters comprising the first value, and
set the first parameter, of the received parameters, to comprise the second value when one of the plurality of paths is the path.

13. A device comprising:
a first component to:
receive a plurality of information regarding communication over a network; and
a second component to perform, based on the received plurality of information, parallel processing to:
determine a plurality of possible routes for transmitting data from an ingress node to an egress node of the network, the network comprising a plurality of nodes connected by a plurality of links, the plurality of nodes including the ingress node and the egress node,
determine, for each of the plurality of possible routes, a link capacity for each of the plurality links corresponding to the respective possible route, the link capacity based on a total amount of data being communicated through the network,
determine, for each of the plurality of possible routes, a maximum link capacity for each of the plurality links corresponding to the respective possible routes,
determine, for each of the plurality of possible routes and based on the corresponding link capacity and the maximum link capacity, a link band to be associated with each of the plurality of links, and
select, from the plurality of possible routes, a path for transmitting the data from the ingress node to the egress node, where the path permits communication over the network within a data range, the data range based on the plurality of information received by the first component.

14. The device of claim 13, further comprising:
a third component to:
generate a plurality of constraint expressions to be used by the second component to perform the parallel processing.

15. The device of claim 14,
where the second component is further to:
solve the plurality of constraint expressions to:
determine the data range for communication over the network, and
select the path for transmitting the data from the ingress node to the egress node.

16. The device of claim 15, where the third component is further to:
generate an objective function to minimize the link load in the network.

17. The device of claim 16, where the second component is further to:
use, when performing the parallel processing, the objective function as an optimization reference.

18. The device of claim 15, where the plurality of information includes a value indicating an amount of data transmitted into the network and another value indicating an amount of data transmitted from the network, and
where the second component is further to:
use the value indicating the amount of the data transmitted into the network and the value indicating the amount of the data transmitted from the network to determine the data range.

* * * * *